(12) United States Patent
Ozaki et al.

(10) Patent No.: US 12,078,401 B2
(45) Date of Patent: Sep. 3, 2024

(54) REFRIGERATION MACHINE

(71) Applicant: TAIYO NIPPON SANSO CORPORATION, Tokyo (JP)

(72) Inventors: Shinsuke Ozaki, Tokyo (JP); Hirokazu Hirai, Tokyo (JP); Masaki Ishii, Tokyo (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 0 days.

(21) Appl. No.: 18/549,224

(22) PCT Filed: Mar. 8, 2022

(86) PCT No.: PCT/JP2022/009892
§ 371 (c)(1),
(2) Date: Sep. 6, 2023

(87) PCT Pub. No.: WO2022/191166
PCT Pub. Date: Sep. 15, 2022

(65) Prior Publication Data
US 2024/0085066 A1 Mar. 14, 2024

(30) Foreign Application Priority Data
Mar. 10, 2021 (JP) .................................. 2021-038688

(51) Int. Cl.
*F25B 9/14* (2006.01)
(52) U.S. Cl.
CPC ...................................... *F25B 9/14* (2013.01)
(58) Field of Classification Search
CPC ........................................................ F25B 9/14
See application file for complete search history.

(56) References Cited

U.S. PATENT DOCUMENTS 5,524,442 A * 6/1996 Bergman, Jr. ........ F25B 25/005
62/401
2016/0018134 A1 1/2016 Ueda et al.

FOREIGN PATENT DOCUMENTS

| JP | 2003207221 A | * 7/2003 | ............. B64D 13/06 |
| JP | 5356983 B2 | 12/2013 | |
| JP | 2018066511 A | 4/2018 | |
| JP | 2020122634 A | 8/2020 | |

(Continued)

OTHER PUBLICATIONS

Zywiak, Environment control system by double turbine boot strap circulation, 2002, Full Document (Year: 2002).*

(Continued)

*Primary Examiner* — Nael N Babaa
(74) *Attorney, Agent, or Firm* — Nixon & Vanderhye P.C.

(57) ABSTRACT

A turbo-Brayton refrigeration machine (11) includes a first circulation path (L1) in which a first refrigerant circulates, a second circulation path (L2) in which a second refrigerant which is a cooling target circulates, a subcooler (22) disposed over the first circulation path (L1) and the second circulation path (L2) and configured to have a single heat-exchanging unit, and an expansion turbine (21) positioned on a primary side of the subcooler (22) in the first circulation path (L1), in which the pressure ratio of the expansion turbine (21) is the pressure ratio at which the outlet temperature of the expansion turbine (21) is higher than a freezing point of the second refrigerant.

10 Claims, 4 Drawing Sheets

(56) References Cited

FOREIGN PATENT DOCUMENTS

WO      2013154185  A1    10/2013
WO      2014192382  A1    12/2014

OTHER PUBLICATIONS

Written Opinion of the International Searching Authority mailed May 17, 2023 in International Application No. PCT/JP2022/009892, with English translation, 6 pages.
International Search Report for PCT/JP2022/009892 mailed May 17, 2022, 4 pages.
Extended European Search Report mailed Jul. 17, 2024 in European Application No. 22767120.3, 9 pages.
Dhillon Aman Kumar et al: "Performance characteristics map using exergy analysis of reverse Brayton cryocooler for HTS applications: Selection, Optimization, Design and Operational guidelines", Cryogenics, Elsevier, vol. 106, Dec. 30, 2019 (Dec. 30, 2019), XP086085075, ISSN: 0011-2275, DOI: 10.1016/J.CRYOGENICS.2019.103024 [retrieved on Dec. 30, 2019], 14 pages.

* cited by examiner

REFRIGERATION MACHINE

This application is the U.S. national phase of International Application No. PCT/JP2022/009892 filed Mar. 8, 2022, which designated the U.S. and claims priority to JP Patent Application No. 2021-038688 filed Mar. 10, 2021, the entire contents of each of which are hereby incorporated by reference.

TECHNICAL FIELD

The present invention relates to a turbo-Brayton refrigeration machine.

Priority is claimed on Japanese Patent Application No. 2021-038688, filed Mar. 10, 2021, the content of which is incorporated herein by reference.

BACKGROUND ART

A turbo-Brayton refrigeration machine has a large cooling capacity compared to other refrigerating types and maintenance can be performed in a shorter amount of time. By having this characteristic, the turbo-Brayton refrigeration machine can be used in cooling a superconductive device such as a superconductive transmission cable and a superconductive current limiter. In cooling the superconductive device, after circulating liquid nitrogen (cooling target) removes invasive heat and generated heat in the superconductive device, the liquid nitrogen returned to the refrigeration machine is cooled in the refrigeration machine.

Patent Document 1 describes a turbo-Brayton refrigeration machine that has a closed cycle in which after a compressed refrigerant gas passes through a main heat exchanger and is expanded by an expansion turbine, the refrigerant gas cools liquid nitrogen in a subcooler and passes through the main heat exchanger again to return to a compressor. In addition, Patent Document 1 describes that the ratio between the pressure on an inlet side and the pressure on an outlet side of the expansion turbine (pressure ratio) is desirably approximately 2.7 in order to obtain high refrigeration machine efficiency in the turbo-Brayton refrigeration machine. In addition, the pressure ratio of 2.0 is described in Patent Document 2.

The refrigerant gas cools the liquid nitrogen in the subcooler to approximately 65 K to 80 K in the turbo-Brayton refrigeration machine described in Patent Document 1, but means for preventing the liquid nitrogen from freezing is necessary since a solidification temperature of the liquid nitrogen is close to 63 K.

Thus, in order to prevent the liquid nitrogen from freezing, a configuration of the turbo-Brayton refrigeration machine in which a structure of a refrigerant flow path of the subcooler is devised or the heating means, such as a heater, is provided on a surface of the subcooler is disclosed in Patent Document 2.

CITATION LIST

Patent Documents

[Patent Document 1]
PCT International Publication No. 2014/192382
[Patent Document 2]
PCT International Publication No. 2013/154185

SUMMARY OF INVENTION

Technical Problem

However, the turbo-Brayton refrigeration machine disclosed in Patent Document 2 requires a subcooler or additional equipment having a complicated refrigerant flow path. In particular, the turbo-Brayton refrigeration machine disclosed in Patent Document 2 decreases the efficiency of the refrigeration machine caused by an increase in the pressure loss of a refrigerant passage.

The present invention has been made in consideration of the above problems, and an object thereof is to provide a turbo-Brayton refrigeration machine that can prevent a cooling target from freezing.

Solution to Problem

In order to achieve the object, the present invention adopts the following configurations.

[1] A turbo-Brayton refrigeration machine, including:
a first circulation path in which a first refrigerant circulates;
a second circulation path in which a second refrigerant which is a cooling target circulates;
a subcooler disposed over the first circulation path and the second circulation path and configured to have a single heat-exchanging unit; and
an expansion turbine positioned on a primary side of the subcooler in the first circulation path,
in which the pressure ratio of the expansion turbine is the pressure ratio at which the outlet temperature of the expansion turbine is higher than a freezing point of the second refrigerant.

[2] The turbo-Brayton refrigeration machine according to [1], in which the pressure ratio of the expansion turbine is 2.0 or lower.

[3] The turbo-Brayton refrigeration machine according to [1] or [2], in which a mixed refrigerant of two or more selected from the group consisting of helium, hydrogen, neon, nitrogen, argon, oxygen, air, and hydrocarbon is used as the first refrigerant.

[4] The turbo-Brayton refrigeration machine according to any one of [1] to [3], in which the second refrigerant is a liquefied gas having a freezing point of 120 K or lower.

[5] The turbo-Brayton refrigeration machine according to [3] or [4], in which the first refrigerant contains at least helium.

[6] The turbo-Brayton refrigeration machine according to [5], in which a mixing proportion of the helium in the first refrigerant is 20% to 95%.

Advantageous Effects of Invention

The turbo-Brayton refrigeration machine of the present invention can prevent a cooling target from freezing.

DESCRIPTION OF EMBODIMENTS

Figure 1:
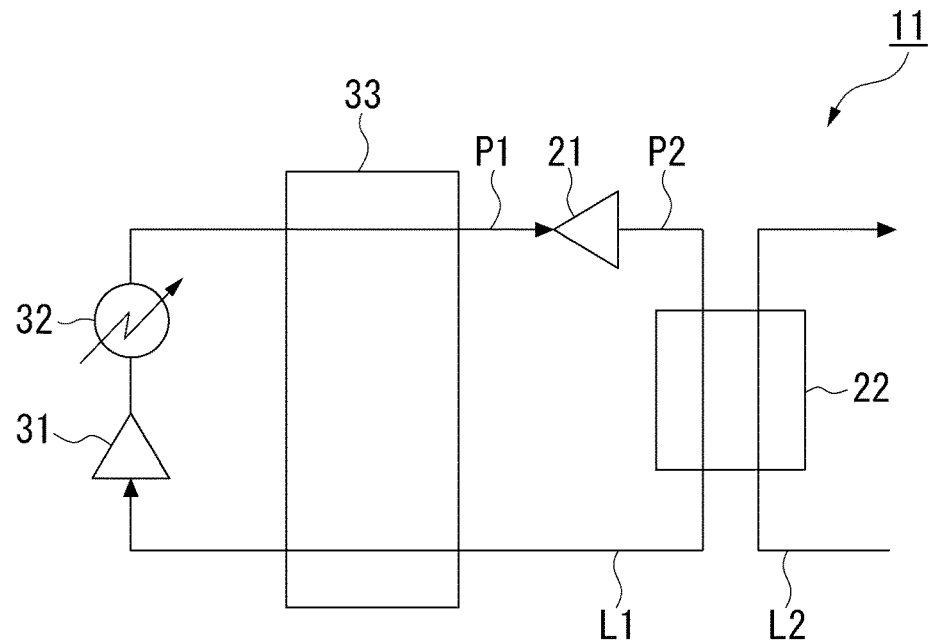
FIG. 1 is a system diagram showing a turbo-Brayton refrigeration machine according to an embodiment of the present invention.

Hereinafter, an embodiment of the present invention will be described in detail with reference to the accompanying drawings.

In the drawings used in the following description, in order to make features easier to understand, characteristic portions will be enlarged for convenience in some cases, and dimensional ratios or the like of each component are not necessarily the same as the actual ones.

<Turbo-Brayton Refrigeration Machine>

First, the configuration of a turbo-Brayton refrigeration machine as an embodiment to which the present invention is applied will be described.

FIG. 1 is a system diagram showing the turbo-Brayton refrigeration machine according to the embodiment of the present invention.

As shown in FIG. 1, a turbo-Brayton refrigeration machine 11 of the present embodiment includes a first circulation path L1 in which a first refrigerant circulates, a second circulation path L2 in which a second refrigerant, which is a cooling target, circulates, a subcooler 22 that is disposed over the first circulation path L1 and the second circulation path L2, and an expansion turbine 21 that is positioned on a primary side of the subcooler 22 in the first circulation path L1.

In addition, a turbo compressor 31, a water-cooled cooler 32, and a main heat exchanger 33 are arranged in the first circulation path L1.

In the turbo-Brayton refrigeration machine 11 of the present embodiment, the pressure ratio of the expansion turbine 21 is the pressure ratio at which the outlet temperature of the expansion turbine 21 becomes a higher temperature than a freezing point of the second refrigerant. For this reason, the cooling target can be prevented from freezing without changing a structure of a refrigerant flow path of the subcooler 22 or providing heating means such as a heater on a surface of the subcooler 22 in order to prevent liquid nitrogen from freezing. The pressure ratio of the expansion turbine 21 is the ratio between the pressure on an inlet side and the pressure on an outlet side of the expansion turbine 21.

In the turbo-Brayton refrigeration machine 11 of the present embodiment, as the first refrigerant compressed by the turbo compressor 31 is expanded by the expansion turbine 21 after being cooled when passing through the water-cooled cooler 32 and the main heat exchanger 33, the temperature thereof further decreases. Next, as the first refrigerant and the second refrigerant exchange heat, the subcooler 22 cools the second refrigerant to a cooling target temperature.

The first refrigerant is a mixed gas of two or more selected from the group consisting of helium, hydrogen, neon, nitrogen, argon, and oxygen. By using the mixed gas described above as the first refrigerant, the turbo-Brayton refrigeration machine maintaining optimum turbine efficiency can be operated without freezing the second refrigerant that is a cooling target.

The second refrigerant is not particularly limited. The second refrigerant is preferably a liquefied gas having a freezing point of 120 K or lower (for example, liquid nitrogen, LNG, and the like).

In the case where the turbo-Brayton refrigeration machine 11 of the present embodiment is used in cooling a superconductive device, the second refrigerant is preferably liquid nitrogen, and the first refrigerant is preferably a mixed refrigerant of two or more selected from the group consisting of helium, hydrogen, and neon. Further, a refrigerant containing at least helium of the mixed refrigerants is more preferable as the first refrigerant.

In the case where the turbo-Brayton refrigeration machine 11 of the present embodiment is used in cooling the superconductive device, a specific method of selecting the pressure ratio and a first refrigerant during an operation of the expansion turbine 21 will be described in detail in the following examples.

In the turbo-Brayton refrigeration machine 11 of the present embodiment, the second refrigerant that is a cooling target can be prevented from freezing without greatly decreasing the efficiency of the expansion turbine 21 by selecting a combination and a mixing proportion of the first refrigerant.

In addition, in the turbo-Brayton refrigeration machine 11 of the present embodiment, in the case where the second refrigerant is set to liquid nitrogen and is used in cooling the superconductive device, the pressure ratio of the expansion turbine 21 is set to 1.53, and the liquid nitrogen can be prevented from freezing by using a mixed refrigerant of neon and helium (neon concentration: 5% to 80% by volume, helium concentration: 20% to 95% by volume) as the first refrigerant without decreasing the efficiency of the expansion turbine 21.

Although the turbo-Brayton refrigeration machine of the present invention has been described hereinbefore with reference to the embodiments, the present invention is not limited to the embodiments. Each of configurations, combinations thereof, and the like in each of the embodiments are examples, and additions, omissions, replacements, and other changes of the configuration can be made without departing from the scope of the present invention.

Examples

Hereinafter, the present invention will be described in detail through verification tests, but the present invention is not limited thereto.

<Verification Test>

In the case where the turbo-Brayton refrigeration machine of the present invention is used in cooling the superconductive device, a specific method of selecting the pressure ratio and a first refrigerant during an operation of an expansion turbine will be described in detail.

(Verification 1)

When using a mixed gas of neon and helium, the relationship between the ratio between the pressure on the inlet side and the pressure on the outlet side of the expansion turbine (pressure ratio) and the temperature difference between the temperature on the inlet side and the temperature on the outlet side of the expansion turbine was verified.

Figure 2:
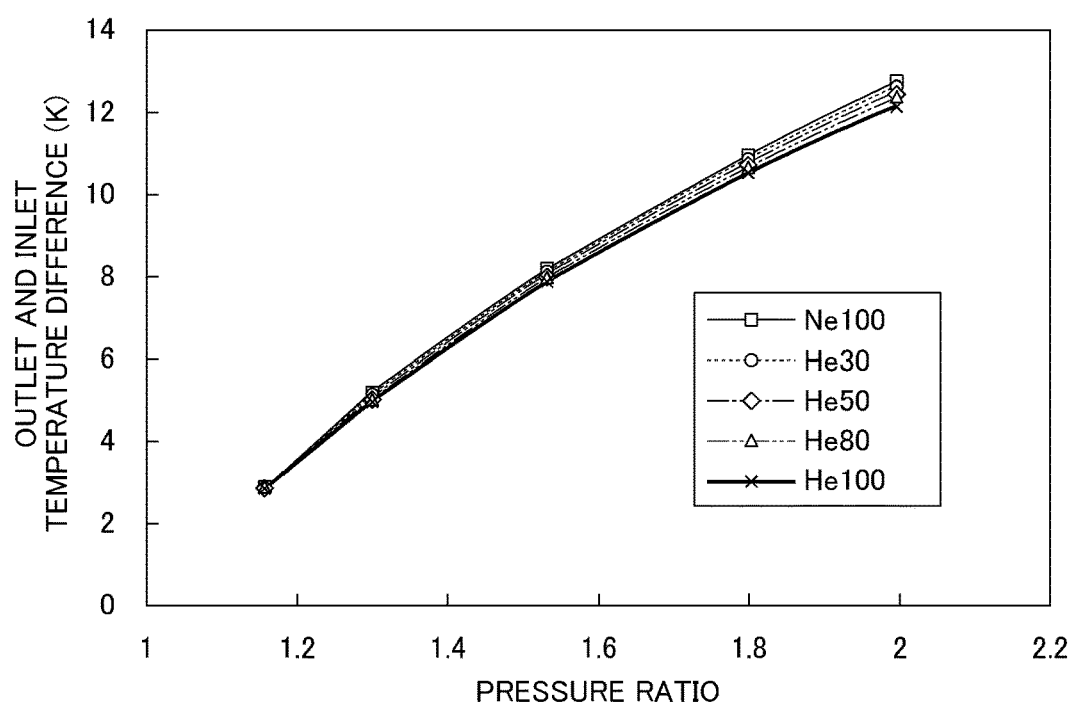
FIG. 2 is a graph showing, when using a mixed gas of neon and helium, the relationship between the ratio between the pressure on an inlet side and the pressure on an outlet side of an expansion turbine (pressure ratio) and the temperature difference between the temperature on the inlet side and the temperature on the outlet side of the expansion turbine.

FIG. 2 is a graph showing, when using the mixed gas of neon and helium, the relationship between the ratio between the pressure on the inlet side and the pressure on the outlet side of the expansion turbine (pressure ratio) and the temperature difference between the temperature on the inlet side and the temperature on the outlet side of the expansion turbine.

Five levels including 0, 30, 50, 80, and 100 (% by volume) were used as the helium concentration in the mixed gas.

In addition, turbine efficiency was set to 70%, and the temperature on the inlet side of the expansion turbine was set to 72 K.

As shown in FIG. 2, it was confirmed that when the pressure ratio was high, the temperature difference between the temperature on the inlet side and the temperature on the outlet side of the expansion turbine was large. On the other hand, it was confirmed that the temperature difference caused by a difference in the helium concentration in the mixed gas was small.

(Verification 2)

When using a mixed gas of neon and helium, the relationship between the ratio between the pressure on the inlet side and the pressure on the outlet side of the expansion turbine (pressure ratio) and an adiabatic heat drop (an enthalpy difference between a turbine inlet and a turbine outlet when ideally expanded adiabatically by a turbine) was verified.

Figure 3:
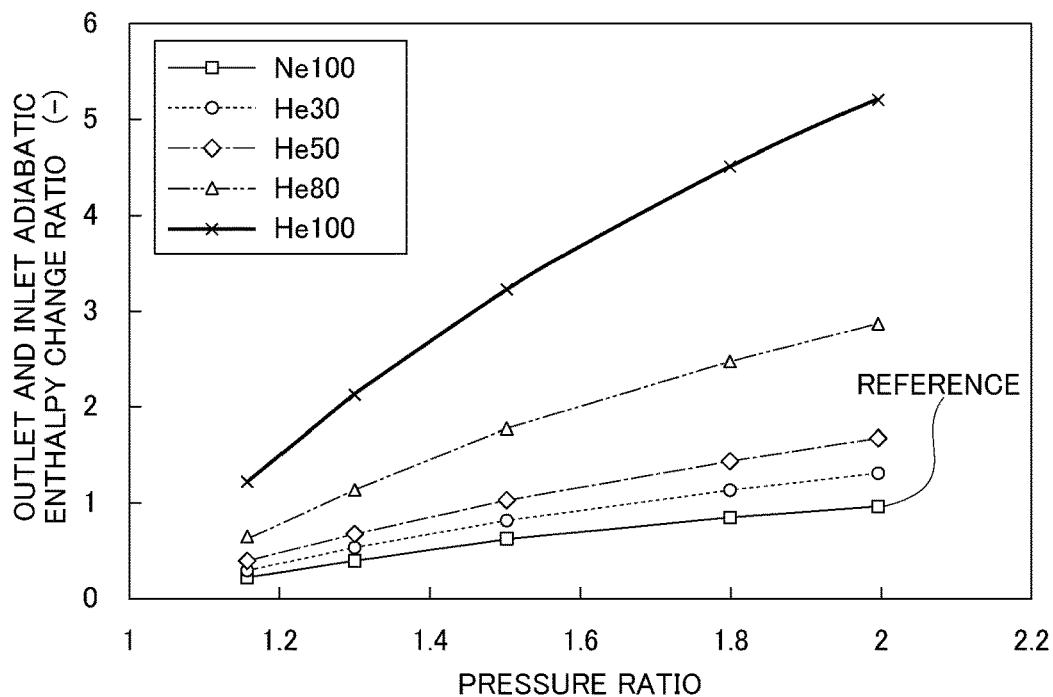
FIG. 3 is a graph showing the relationship between the ratio between the pressure on the inlet side and the pressure on the outlet side of the expansion turbine (pressure ratio) and the ratio of an adiabatic enthalpy change in the case where an adiabatic enthalpy change ratio of a reference refrigerant (neon) is set as reference (1.0) when operating with the pressure ratio of the expansion turbine set to 2.0.

FIG. 3 is a graph showing the relationship between the ratio between the pressure on the inlet side and the pressure on the outlet side of the expansion turbine (pressure ratio) and the ratio of an adiabatic heat drop in the case where an adiabatic heat drop ratio of a reference refrigerant (neon) was set as reference (1.0) when operating with the pressure ratio of the expansion turbine set to 2.0.

The five levels including 0, 30, 50, 80, and 100 (% by volume) were used as the helium concentration in the mixed gas.

As shown in FIG. 3, when ratios of adiabatic heat drops at the same pressure ratio were compared, it was confirmed that the ratio of the adiabatic heat drops increased as the helium concentration in the mixed gas increased.

(Verification 3)

When using a mixed gas of neon and helium, the relationship between the helium concentration in the mixed gas and the ratio of the density of the mixed gas in the case where the density of 100% neon by volume was set to reference (1.0) was verified.

Figure 4:
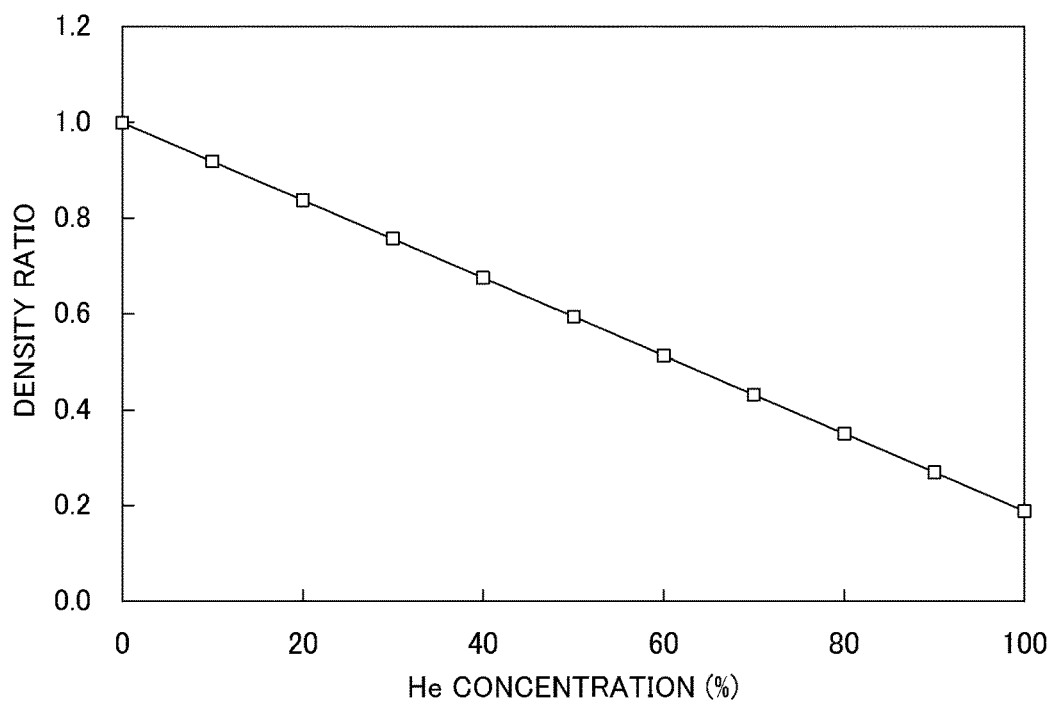
FIG. 4 is a graph showing the relationship between the helium concentration in the mixed gas of neon and helium and the ratio of the density of the mixed gas in the case where the density of 100% neon by volume is set to reference (1.0).

FIG. 4 is a graph showing the relationship between the helium concentration in the mixed gas of neon and helium and the ratio of the density of the mixed gas in the case where the density of 100% neon by volume was set to reference (1.0).

As shown in FIG. 4, it was confirmed that when the helium concentration in the mixed gas of neon and helium increased, the density decreased.

Based on 1 to 3 above, a condition in which the temperature difference between the temperature on the inlet side and the temperature on the outlet side of the expansion turbine was 8 K was examined.

Since the temperature difference caused by a difference in the helium concentration in the mixed gas was small according to the result of verification 1 described above, when the temperature difference between the temperature on the inlet side and the temperature on the outlet side of the expansion turbine with respect to the pressure ratio in the case where the helium concentration in the mixed gas was 50% was required, Equation 1 below was satisfied.

$$\Delta T = -4.9747 P_r^2 + 27.027 P_r - 21.67 \quad \text{[Equation 1]}$$

In equation 1 above, ΔT is the temperature difference between an expansion turbine outlet and inlet, and Pr is the pressure ratio of the expansion turbine outlet and inlet.

According to equation 1, the temperature difference between the temperature on the inlet side and the temperature on the outlet side of the expansion turbine was 8 K at the pressure ratio of the expansion turbine of 1.53.

A condition in which 100% neon was used as a refrigerant described in Patent Document 2, which is a specific turbo-Brayton refrigeration machine, and the pressure ratio of the expansion turbine was 2.0 was set as Example 1. In addition, in the case where the generated cold obtained with Example 1 as reference was the same, a condition in which 100% neon was used as a refrigerant and the pressure ratio of the expansion turbine was 1.53 was set as Example 2, and a condition in which a mixed gas having the helium concentration of 50% was used as a refrigerant and the pressure ratio of the expansion turbine was 1.53 was set as Example 3.

Table 1 shows all of the adiabatic enthalpy change ratios, mass flow rate ratios, volume flow rate ratios, specific speed ratios of the turbine of Example 2 and Example 3 in the case where an adiabatic heat drop, a mass flow rate, a volume flow rate, and the specific speed of the turbine of Example 1 were set as reference.

TABLE 1

|  | Refrigerant | Temperature difference | Pressure ratio | Adiabatic enthalpy change ratio | Mass flow rate ratio | Volume flow rate ratio | Specific speed ratio |
|---|---|---|---|---|---|---|---|
| Example 1 | Ne100% | 12.4 | 2.0 | 1 | 1 | 1 | 1 |
| Example 2 | Ne100% | 8.2 | 1.53 | 0.65 | 1.54 | 1.54 | 1.71 |
| Example 3 | He50% | 8.0 | 1.53 | 1.1 | 0.91 | 1.52 | 1.15 |

As shown in Table 1, the temperature difference between the temperature on the inlet side and the temperature on the outlet side of the expansion turbine of each of Example 2 and Example 3 was 8.0 to 8.2 K.

In addition, since the pressure ratio was 1.53 and the adiabatic enthalpy change ratio was 0.65 times in Example 2, the mass flow rate ratio and the volume flow rate ratio were both 1.54 times.

In addition, in Example 3, since the pressure ratio was 1.53 and the adiabatic enthalpy change ratio was 1.1 times, the mass flow rate ratio was 0.91 times, and since a refrigerant containing 50% He had a low density compared to the refrigerant of 100% Ne, the volume flow rate ratio was 1.52 times.

In addition, since the specific speed ratio of the expansion turbine was proportional to the 0.5th power of the volume flow rate ratio and the −0.75th power of the adiabatic enthalpy change ratio, the specific speed ratio of Example 2 was 1.71 times and was 1.15 times in Example 3 compared to Example 1, which was a reference condition.

Therefore, it was found that in the case where the same generated cold was obtained by the expansion turbine, by selecting an appropriate helium mixed concentration of a refrigerant gas, the temperature difference between the temperature on the inlet side and the temperature on the outlet side of the expansion turbine could be changed without significantly changing the specific speed ratio of the expansion turbine.

(Verification 4)

The relationship between the specific speed of the expansion turbine and efficiency was verified.

Figure 5:
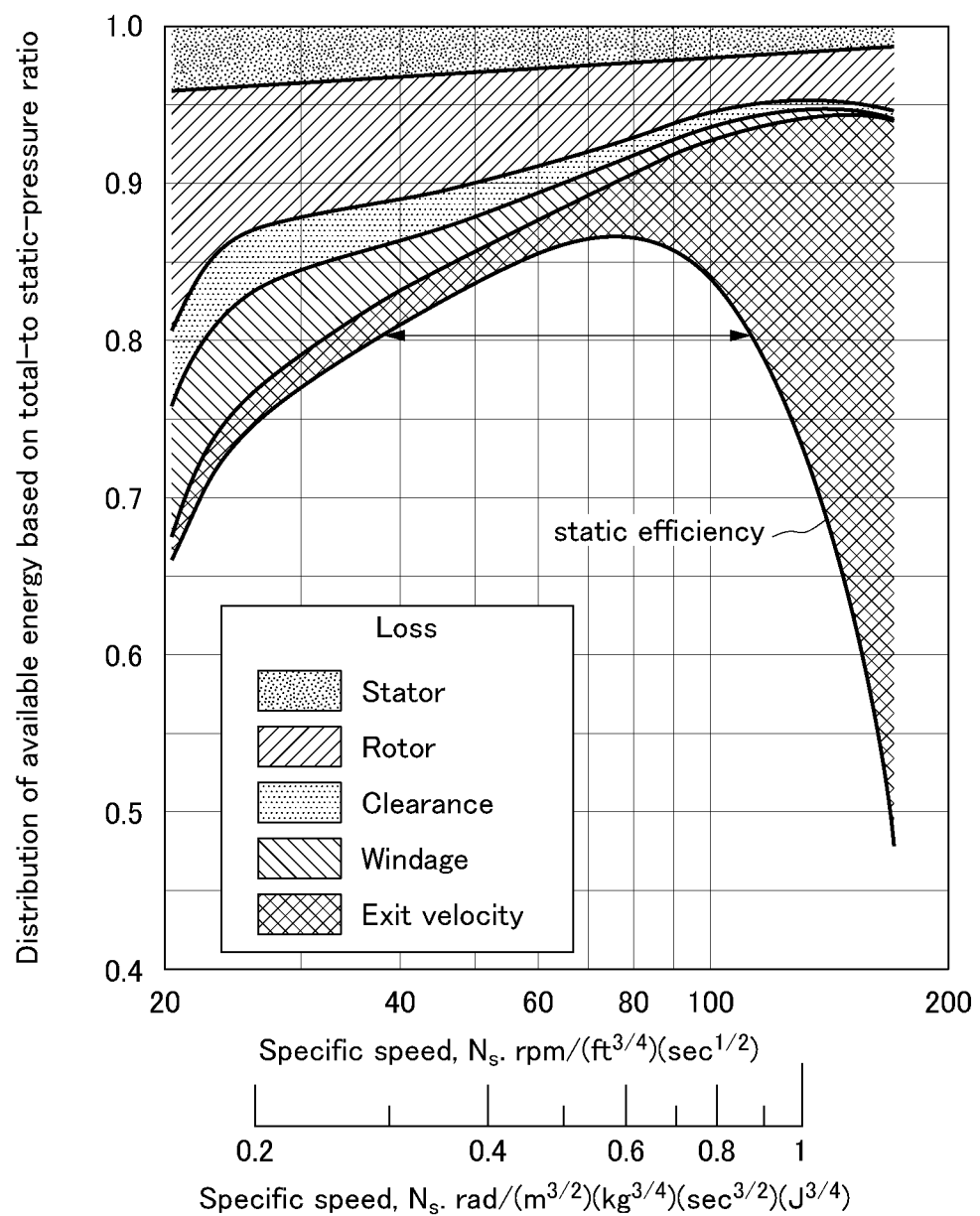
FIG. 5 is a graph showing an example of the relationship between the specific speed of a turbine and efficiency.

FIG. 5 is a graph showing an example of the relationship between the specific speed of the turbine and efficiency.

As shown in FIG. 5, in general, in the turbine, efficiency was maximum (peak) under the condition in which the specific speed was 0.6, and efficiency was high (efficiency of 80% or more) in the range of the specific speed of 0.3 to 0.9.

Based on the result of verification 4 described above, a method of determining a mixing proportion of neon to helium, which were used as refrigerants, was examined.

From the result of verification 4 described above, an allowable range of the specific speed ratio of the expansion turbine was, when the specific speed of 0.6 at which efficiency was maximum was set to reference, a range of 0.5 to 1.5 times the reference specific speed.

It was found that the specific speed ratio is as high as 1.71 and the efficiency of the turbine decreases in Example 2 described above.

On the other hand, it was found that the specific speed ratio was 1.15 and the turbine could be maintained with high efficiency in Example 3.

Figure 6:
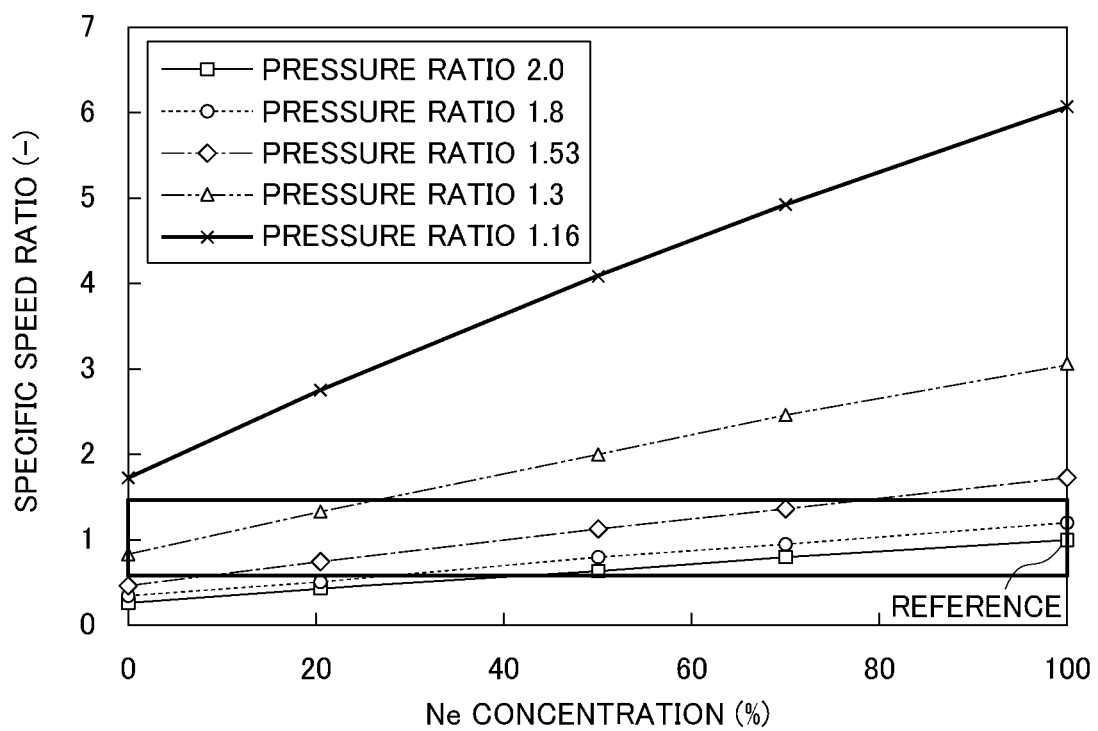
FIG. 6 is a graph showing the relationship between the neon concentration in the mixed gas and the specific speed ratio of the expansion turbine.

FIG. 6 is a graph showing the relationship between a neon concentration in a mixed gas and the specific speed ratio of the expansion turbine.

Five levels including 1.16, 1.30, 1.53, 1.8, and 2.0 were used as the pressure ratio of the expansion turbine.

In addition, the specific speed ratio of the expansion turbine had, as reference (1.0), the specific speed when 100% neon was used as a refrigerant and the pressure ratio of the expansion turbine was set to 2.0.

In the case where the pressure ratio was 1.53, the relationship between the neon concentration in the mixed gas and the specific speed ratio of the expansion turbine can be represented by equation 2 below.

$$n' = -1.964 \times 10^{-5} \times Ne^2 + 1.416 \times 10^{-2} \times Ne - 0.488 \quad \text{[Equation 2]}$$

In equation 2 above, n' is the specific speed ratio, and Ne is a neon concentration (% by volume) in a mixed gas.

Table 2 shows the relationship between the specific speed ratio of the expansion turbine acquired through equation 2 above and the neon concentration in the mixed gas.

TABLE 2

| Specific speed ratio | Ne concentration (%) |
|---|---|
| 0.49 | 0 |
| 0.56 | 5 |
| 0.63 | 10 |
| 0.70 | 15 |
| 0.76 | 20 |
| 0.83 | 25 |
| 0.90 | 30 |
| 0.96 | 35 |
| 1.02 | 40 |
| 1.09 | 45 |
| 1.15 | 50 |
| 1.21 | 55 |
| 1.27 | 60 |
| 1.33 | 65 |
| 1.38 | 70 |
| 1.44 | 75 |
| 1.50 | 80 |
| 1.55 | 85 |
| 1.60 | 90 |
| 1.66 | 95 |
| 1.71 | 100 |

As shown in Table 2, it was found that when the neon concentration in the mixed gas was 40%, the specific speed (1.02) was equivalent to the reference specific speed (1.0).

Therefore, in the case where there was a condition in which the temperature difference between the temperature on the inlet side and the temperature on the outlet side of the expansion turbine was 8 K, since the specific speed ratio was in the range of 0.5 to 1.5 in order to maintain the expansion turbine with high efficiency, it was confirmed that the neon concentration in the mixed gas should be preferably selected in the range of 5% to 80% (the helium concentration was 20% to 95%).

(Verification 5)

Table 3 shows the value of each specific speed ratio in a mixing proportion of neon to helium in a mixed gas for each of the five levels of the pressure ratio of the expansion turbine including 1.16, 1.30, 1.53, 1.8, and 2.0 shown in FIG. 6.

TABLE 3

| Refrigerant gas | Pressure ratio | | | | |
|---|---|---|---|---|---|
| Mixing proportion | 2.0 | 1.8 | 1.53 | 1.3 | 1.16 |
| Ne100/He0 | 1.000 | 1.193 | 1.710 | 3.024 | 6.073 |
| Ne70/He30 | 0.805 | 0.961 | 1.380 | 2.441 | 4.918 |
| Ne50/He50 | 0.667 | 0.797 | 1.145 | 2.029 | 4.081 |
| Ne20/He80 | 0.447 | 0.535 | 0.770 | 1.367 | 2.756 |
| Ne0/He100 | 0.280 | 0.336 | 0.484 | 0.862 | 1.740 |

As shown in Table 3, the relationship between the mixing proportion of neon to helium in the mixed gas and the specific speed ratio could be confirmed for each pressure ratio of the expansion turbine.

Based on the results shown in Table 3, it was suggested that when operating the turbo-Brayton refrigeration machine of the present invention, even in the case where a value other than 1.53 was selected as the pressure ratio during an operation of the expansion turbine, an appropriate mixing proportion of neon to helium in the mixed gas could be determined.

REFERENCE SIGNS LIST

11: Turbo-Brayton refrigeration machine
21: Expansion turbine
22: Subcooler
31: Turbo compressor
32: Water cooler
33: Main heat exchanger
L1: First circulation path
L2: Second circulation path

What is claimed is:

1. A turbo-Brayton refrigeration machine, comprising:
a first circulation path in which a first refrigerant circulates;
a second circulation path in which a second refrigerant which is a cooling target circulates;
a subcooler disposed over the first circulation path and the second circulation path and configured to have a single heat-exchanging unit; and
an expansion turbine positioned on a primary side of the subcooler in the first circulation path,
wherein the pressure ratio of the expansion turbine is the pressure ratio at which the outlet temperature of the expansion turbine is higher than a freezing point of the second refrigerant.

2. The turbo-Brayton refrigeration machine according to claim 1,
wherein the pressure ratio of the expansion turbine is 2.0 or lower.

3. The turbo-Brayton refrigeration machine according to claim 1,
wherein a mixed refrigerant of two or more selected from the group consisting of helium, hydrogen, neon, nitrogen, argon, oxygen, air, and hydrocarbon is used as the first refrigerant.

4. The turbo-Brayton refrigeration machine according to claim 1,
wherein the second refrigerant is a liquefied gas having a freezing point of 120 K or lower.

5. The turbo-Brayton refrigeration machine according to claim 3,
wherein the first refrigerant contains at least helium.

6. The turbo-Brayton refrigeration machine according to claim 5,
wherein a mixing proportion of the helium in the first refrigerant is 20% to 95%.

7. The turbo-Brayton refrigeration machine according to claim 2,
wherein a mixed refrigerant of two or more selected from the group consisting of helium, hydrogen, neon, nitrogen, argon, oxygen, air, and hydrocarbon is used as the first refrigerant.

8. The turbo-Brayton refrigeration machine according to claim 2,
wherein the second refrigerant is a liquefied gas having a freezing point of 120 K or lower.

9. The turbo-Brayton refrigeration machine according to claim 3,
wherein the second refrigerant is a liquefied gas having a freezing point of 120 K or lower.

10. The turbo-Brayton refrigeration machine according to claim 4,
wherein the first refrigerant contains at least helium.

* * * * *